United States Patent
Oe

(10) Patent No.: US 10,725,710 B2
(45) Date of Patent: Jul. 28, 2020

(54) HIERARCHICAL STORAGE DEVICE, HIERARCHICAL STORAGE CONTROL DEVICE, COMPUTER-READABLE RECORDING MEDIUM HAVING HIERARCHICAL STORAGE CONTROL PROGRAM RECORDED THEREON, AND HIERARCHICAL STORAGE CONTROL METHOD

(71) Applicant: FUJITSU LIMITED, Kawasaki-shi, Kanagawa (JP)

(72) Inventor: Kazuichi Oe, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 549 days.

(21) Appl. No.: 15/065,953

(22) Filed: Mar. 10, 2016

(65) Prior Publication Data

US 2016/0283136 A1    Sep. 29, 2016

(30) Foreign Application Priority Data

Mar. 26, 2015   (JP) .................................. 2015-064729

(51) Int. Cl.
*G06F 3/06* (2006.01)

(52) U.S. Cl.
CPC .......... *G06F 3/0685* (2013.01); *G06F 3/0605* (2013.01); *G06F 3/0649* (2013.01); *G06F 3/0653* (2013.01)

(58) Field of Classification Search
CPC ...... G06F 3/0685; G06F 3/061; G06F 3/0647; G06F 3/0649; G06F 3/0689;
(Continued)

(56) References Cited

U.S. PATENT DOCUMENTS

| 5,491,810 A * | 2/1996 | Allen ..................... G06F 3/0608 707/999.2 |
| 8,688,878 B1 * | 4/2014 | Dolan ..................... G06F 3/061 710/33 |

(Continued)

FOREIGN PATENT DOCUMENTS

| JP | 2013-168162 | 8/2013 |
| JP | 2013-246773 | 12/2013 |

(Continued)

OTHER PUBLICATIONS

Oe et al., On-The-Fly-Automated Storage Tiering (OTF-AST), "Proposal for On-The-Fly—Automated Storage Tiering (OTF-AST)", vol. 2014-OS-128 No. 6, (2014), partial translation (14 pages).

*Primary Examiner* — Nathan Sadler
(74) *Attorney, Agent, or Firm* — Fujitsu Patent Center

(57) ABSTRACT

The hierarchical storage device includes: a collecting unit collecting access information related to each unit area included in a first storage device; a first specifying unit specifying a movement target area in the first storage device using a first parameter based on the access information collected by the collecting unit; a second specifying unit specifying a movement target area candidate in the first storage device using each parameter based on the access information; a counting unit counting a number of occurrences of data accesses to the movement target area candidate specified per parameter by the second specifying unit, based on the access information; and an updating unit determining as a recommended parameter the parameter whose number of occurrences of data accesses counted by the counting unit is the largest, and updating the first (Continued)

parameter used by the first specifying unit using the recommended parameter, and can efficiently exhibit device performance.

8 Claims, 9 Drawing Sheets

(58) Field of Classification Search
CPC .... G06F 3/0605; G06F 3/0653; G06F 3/0644; G06F 17/03221
See application file for complete search history.

(56) References Cited

U.S. PATENT DOCUMENTS

| | | | |
|---|---|---|---|
| 9,116,914 B1* | 8/2015 | Muthirisavenugopal | ................... G06F 17/30233 |
| 9,665,288 B1* | 5/2017 | Aharoni | .................. G06F 3/061 |
| 10,127,234 B1* | 11/2018 | Krishnan | .............. G06F 16/119 |
| 2005/0289308 A1* | 12/2005 | Kano | .................... G06F 3/0605 711/161 |
| 2011/0082988 A1 | 4/2011 | Kono et al. | |
| 2011/0314069 A1* | 12/2011 | Alatorre | ............ G06F 17/30082 707/827 |
| 2012/0246386 A1 | 9/2012 | Akutsu et al. | |
| 2014/0108759 A1* | 4/2014 | Iwamitsu | .............. G06F 3/0604 711/165 |
| 2014/0244959 A1 | 8/2014 | Oe et al. | |
| 2015/0378848 A1* | 12/2015 | Kaneko | ................... G06F 11/20 714/19 |
| 2016/0048355 A1* | 2/2016 | Iliadis et al. | .......... G06F 3/0607 711/171 |
| 2016/0283129 A1* | 9/2016 | Wang | ..................... G06F 3/061 |

FOREIGN PATENT DOCUMENTS

| | | |
|---|---|---|
| JP | 2013-543996 | 12/2013 |
| JP | 2014-164510 | 9/2014 |

* cited by examiner

FIG. 7

| SUB LUN ID | 1 | 2 | 3 | 4 | | 300 |
|---|---|---|---|---|---|---|
| 10:00 | 120 | *720* | 0 | 210 | ┄ | 420 |
| 10:01 | 110 | *760* | 20 | 0 | ┄ | 108 |

← SSD HIT

HIERARCHICAL STORAGE DEVICE, HIERARCHICAL STORAGE CONTROL DEVICE, COMPUTER-READABLE RECORDING MEDIUM HAVING HIERARCHICAL STORAGE CONTROL PROGRAM RECORDED THEREON, AND HIERARCHICAL STORAGE CONTROL METHOD

CROSS-REFERENCE TO RELATED APPLICATION

This application is based upon and claims the benefit of priority of the prior Japanese Patent application No. 2015-064729, filed on Mar. 26, 2015, the entire contents of which are incorporated herein by reference.

FIELD

The embodiment discussed herein is related to a hierarchical storage device, a hierarchical storage control device, a computer-readable recording medium having a hierarchical storage control program recorded thereon, and a hierarchical storage control method.

BACKGROUND

A hierarchical storage system configured by combining an Solid State Drive (SSD) and an Hard Disk Drive (HDD) in order to improve cost performance of a storage system is known. In a hierarchical storage system, by placing, in an SSD, data whose access frequency is high in a certain period, a data access speed is increased.

An access pattern to a file sharing storage has characteristics that an Input Output (IO) concentrates on a narrow range of a storage area for several minutes to several tens of minutes, and the IO moves to another area as time passes. Therefore, a conventional hierarchical storage system which moves data at a frequency of a long period of time is not effective.

Hence, in recent years, On-The-Fly-Automated Storage Tiering (OTF-AST) of capturing an area in which IO concentration has occurred in a short period of time every time and moving this area to an SSD in a hierarchical storage system is known.

FIG. 9 is a diagram for explaining the OTF-AST. A control device 110 illustrated in FIG. 9 is connected to an SSD 120 and an HDD 130, and composes a storage system.

According to the OTF-AST, a LUN which is one storage volume recognized by a server which is not illustrated is managed in a sub LUN (subLUN) unit which is one unit divided by a predetermined size (e.g. 1 GByte).

The control device 110 includes an analysis/configuration change engine 111 and a hierarchical driver 112. The analysis/configuration change engine 111 determines which sub LUN needs to be moved to an SSD. The hierarchical driver 112 moves a sub LUN between the SSD 120 and the HDD 130 and sorts a user IO to the SSD 120 or the HDD 130.

The hierarchical driver 112 controls movement (transfer) of data in sub LUN units between the HDD 130 and the SSD 120.

As illustrated in FIG. 9, the hierarchical driver 112 includes a dispatcher 112a, a hierarchical table 112b and a temporary buffer 112c.

The dispatcher 112a instructs a HDD driver 114 and an SSD driver 113 to move (transfer) data in sub LUN units by referring to the hierarchical table 112b. The dispatcher 112a moves a sub LUN between the SSD 120 and the HDD 130 by using, for example, a kcopyd function of copying data between devices without synchronization.

The hierarchical table 112b is a table indicating an association between the SSD 120 and the HDD 130. The temporary buffer 112c temporarily stores an IO request.

The SSD driver 113 controls an access to the SSD 120 based on an instruction of the hierarchical driver 112. The HDD driver 114 controls an access to the HDD 130 based on an instruction of the hierarchical driver 112.

Hereinafter, an operation of the analysis/configuration change engine 111 will be described. The analysis/configuration change engine 111 includes a log pool 111a, a workload analyzer 111b and a movement instructing unit 111c. The log pool 111a counts and accumulates the number of IOs per sub LUN at, for example, a one-minute interval. The log pool 111a collects information of an IO traced for the SSD 120 or the HDD 130 by using, for example, blktrace.

The workload analyzer 111b performs movement determination by extracting one last data from counted data accumulated in the log pool 111a. More specifically, the workload analyzer 111b performs the following process.

(Process 1) The workload analyzer 111b extracts one item of last registered data from the log pool 111a.

(Process 2) The workload analyzer 111b rearranges sub LUNs in order from a larger number of IOs, extracts n upper sub LUNs and counts numbers of IOs of these sub LUNs.

(Process 3) When a total value of the numbers of IOs in the process 2 is less than m % of a total number of IOs, a load difference from other sub LUNs is not sufficiently great and no advantage is obtained by moving a sub LUN to the SSD 120; accordingly the workload analyzer 111b moves to a process 6 described below.

(Process 4) The workload analyzer 111b determines a sub LUN which is extracted continuously c times among the sub LUNs extracted in the process 2, as a sub LUN to be moved to the SSD 120. This is because it can be expected that a high load can be expected to be continued in this sub LUN.

(Process 5) The sub LUNs extracted in the above process 2 are temporarily stored in the workload analyzer 111b. Further, items of data which are not extracted c times or more among items of data of previously stored sub LUNs are discarded.

(Process 6) The workload analyzer 111b sleeps for one minute, for example, and then returns to the process 1.

In the above processes 1 to 6, values of n, m and c are tuning parameters for determining the number of sub LUNs which are moved between the HDD 130 and the SSD 120, and a movement timing, and an optimal value differs according to a load (workload) produced by the OTF-AST.

The conventional storage system calculates the values of n, m and c based on a workload analysis result in last several days, and performs the OTF-AST by using these values of n, m and c. That is, OTF-AST control is performed assuming that the same access pattern as that in the last several days continues.

Hence, there is a problem that it is not possible to efficiently perform the OTF-AST control which supports a change in a workload or a change in a user's access pattern and it is not possible to sufficiently exhibit performance of the hierarchical storage system.

[Patent Literature 1] Japanese Laid-open Patent Publication No. 2014-164510

[Patent Literature 2] Japanese National Publication of International Patent Application No. 2013-543996

[Patent Literature 3] Japanese Laid-open Patent Publication No. 2013-246773

[Patent Literature 4] Japanese Laid-open Patent Publication No. 2013-168162

SUMMARY

According to an aspect of the embodiments, to achieve the above object, a hierarchical storage device includes: a first storage device; a second storage device that has higher data access performance than data access performance of the first storage device; a collecting unit that collects access information related to each of a plurality of unit areas included in the first storage device; a first specifying unit that specifies a movement target area in which data is moved between the first storage device and the second storage device, by using a first parameter based on the access information collected by the collecting unit; a movement processing unit that moves to the second storage device the data of the movement target area of the first storage device specified by the first specifying unit; a second specifying unit that specifies a movement target area candidate in which data is moved between the first storage device and the second storage device per parameter by using each of a plurality of parameters based on the access information collected by the collecting unit; a counting unit that counts a number of occurrences of data accesses to the movement target area candidate specified per each of the plurality of parameters by the second specifying unit, based on the access information collected by the collecting unit; and an updating unit that determines as a recommended parameter the parameter whose number of occurrences of data accesses counted by the counting unit is the largest, and updates the first parameter used by the first specifying unit by using the recommended parameter.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating an example of information counted by a performance estimator of the hierarchical storage device according to the example of the embodiment;

DESCRIPTION OF EMBODIMENT(S)

An embodiment related to a hierarchical storage device, a hierarchical storage control device, a computer-readable recording medium having a hierarchical storage control program recorded thereon and a hierarchical storage control method will be described below with reference to the drawings. However, the following embodiment is only an exemplary embodiment, and does not intent to exclude various modified examples or application of techniques which will not be explicitly described in the embodiment. That is, the present embodiment can be variously deformed and carried out without departing from a spirit of the present embodiment. Alternatively, each drawing does not intend to mean that only components illustrated in each drawing are included but intend to mean that other functions can be included.

Figure 1:
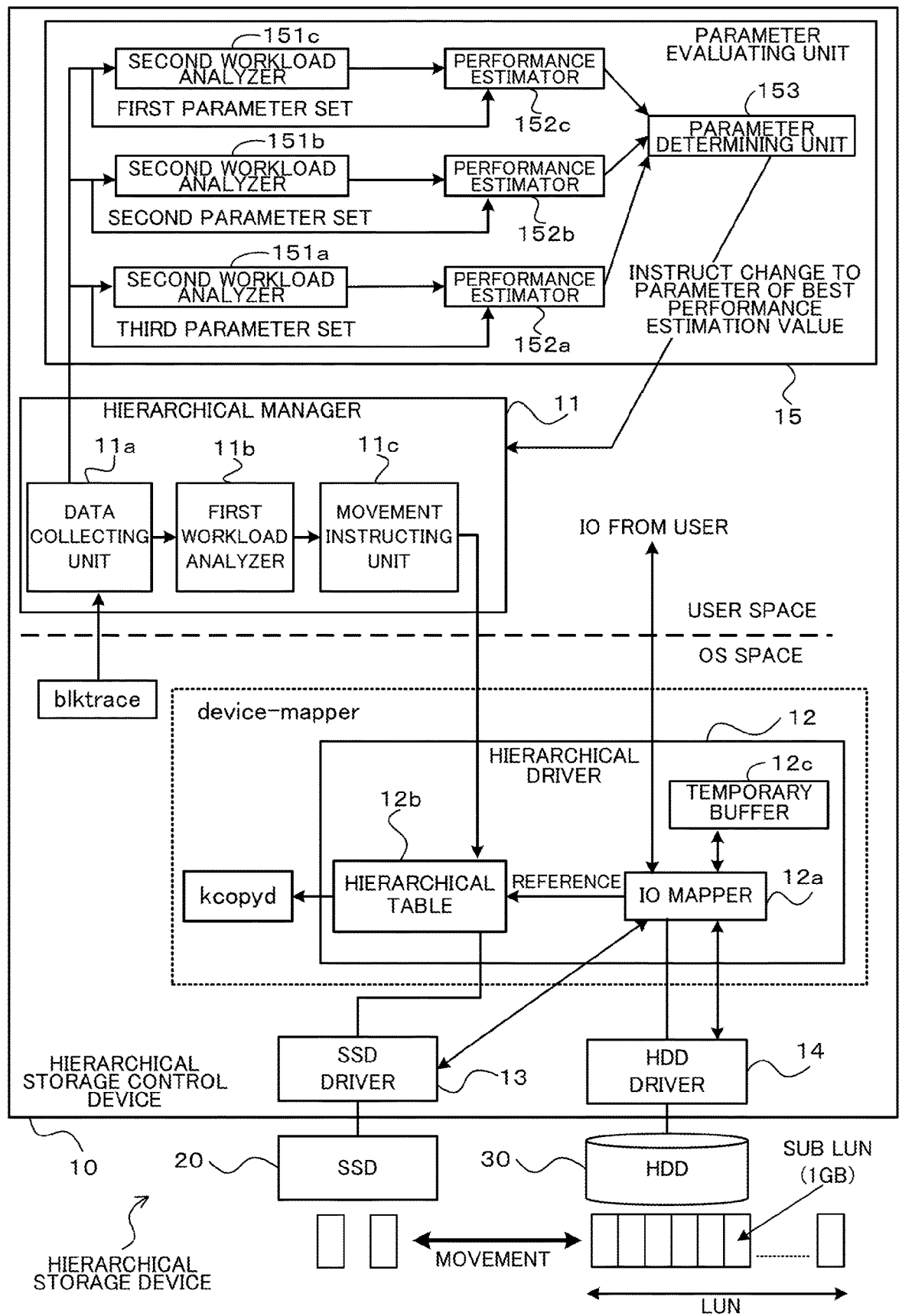
FIG. 1 is a diagram illustrating a configuration of a hierarchical storage device according to an example of an embodiment.

FIG. 1 is a diagram illustrating a configuration of a hierarchical storage device 1 according to an example of the embodiment. As illustrated in FIG. 1, the hierarchical storage device (storage device) 1 includes a hierarchical storage control device 10, an SSD 20 and an HDD 30.

The hierarchical storage control device 10 can make various accesses to the SSD 20 and the HDD 30 according to a user IO from a host device via an input device or a network which is not illustrated. For example, the hierarchical storage control device 10 can make a read or write access to the SSD 20 and the HDD 30. The hierarchical storage control device 10 includes a personal computer (PC), a server or an information processing device such as a controller module (CM).

Further, the hierarchical storage control device 10 according to the present embodiment can perform dynamic hierarchical control of arranging an area of a low access frequency in the HDD 30 and arranging an area of a high access frequency in the SSD 20 according to an access frequency of a user IO.

The HDD (first storage device) 30 is an example of a storage device which stores various items of data and programs, and the SSD (second storage device) 20 is an example of a storage device which has performance (e.g. high speed) different from that of the HDD 30. In the present embodiment, a magnetic disk device such as the HDD 30 and a semiconductor drive device such as the SSD 20 will be described as examples of storage devices which are different from each other (referred to as the first and second storage devices below for ease of description). The present embodiment is not limited to this. Various storage devices which have a difference in performance (e.g. a difference in a reading/writing speed) only need to be used as the first and second storage devices.

The SSD 20 and the HDD 30 configure a storage volume in the hierarchical storage device 1.

One storage volume which is recognized from, for example, a host device will be referred to as a Logical Unit Number (LUN). Further, one unit (unit area) obtained by dividing a LUN by a predetermined size (e.g. 1 GByte) will be referred to as a sub LUN (sub LUN). In addition, a sub LUN will be also referred to as a segment in some cases. A sub LUN ID which is identification information is allocated and set to a sub LUN in order of smaller Logical Block Addressing (LBA). For example, when a LUN having a volume of 300 GB is divided in 1 GB units, the 300 sub LUNs are provided, and a size of one sub LUN is 1 GB (see FIGS. 2A and 2B). An example where a size of a sub LUN is 1 GB will be described below. In this example, the sub LUN IDs start from 1 and ends at 300. By using these sub LUN IDs, it is possible to specify individual sub LUNs.

Each of the SSD 20 and the HDD 30 includes a storage area in which data of a sub LUN (unit area) on a storage volume can be stored. The hierarchical storage control device 10 controls area movement between the SSD 20 and the HDD 30 in sub LUN units.

In addition, FIG. 1 illustrates that the hierarchical storage device 1 includes one SSD 20 and one HDD 30, respectively. However, the hierarchical storage device 1 is not limited to this, and may include a plurality of SSDs 20 and a plurality of HDDs 30.

[1] Explanation of Hierarchical Storage Control Device

Next, the hierarchical storage control device 10 will be described in detail.

As illustrated in FIG. 1, the hierarchical storage control device 10 includes, for example, a hierarchical manager 11, a hierarchical driver 12, an SSD driver 13, a parameter evaluating unit 15 and an HDD driver 14. In addition, for example, the hierarchical manager 11 is realized as a program executed in a user space, and the hierarchical driver 12, the SSD driver 13 and the HDD driver 14 are realized as programs executed in an Operating System (OS) space.

The hierarchical storage control device 10 realizes OTF-AST of capturing an area in which IO concentration occurs in a short period of time every time and moving the area to the SSD 20.

In the present embodiment, the hierarchical storage control device 10 uses, for example, a Linux (registered trademark) device-mapper function. Device-mapper monitors a storage volume in sub LUN units, and moves data of a sub LUN of a high load from the HDD 30 to the SSD 20 to process an IO to a high load area.

For example, when an application executed in the user space of the hierarchical storage control device 10 issues a copy instruction as a data storage destination change request, the hierarchical driver 12 executed in the OS space instructs kcopyd which copies data between devices without synchronization to copy (move) data between the SSD 20 and the HDD 30 to change a storage destination. That is, kcopyd moves a sub LUN between the HDD 30 and the SSD 20.

In addition, when a user issues an IO request while kcopyd moves the sub LUN, the hierarchical driver 12 stores an IO request in a pending que such as a memory which is not illustrated, and stands by until moving the sub LUN has been finished. In addition, device-mapper and kcopyd are implemented as computer programs.

The hierarchical manager 11 specifies a sub LUN (extracts a movement candidate) which whose data is moved from the HDD 30 to the SSD 20 by analyzing a data access to the sub LUN. Further, the hierarchical manager 11 moves the data of the sub LUN from the SSD 20 to the HDD 30 or from the HDD 30 to the SSD 20.

The hierarchical manager 11 determines a sub LUN which is moved between areas, based on information of an IO traced for the SSD 20 or/and the HDD 30 by using, for example, blktrace, and instructs the hierarchical driver 12 to move data of the determined sub LUN. In this regard, blktrace is a command for tracing an IO at a block IO level. The hierarchical manager 11 may use iostat which is a command for checking a use situation of a disk IO instead of blktrace. In addition, blktrace and iostat are executed in the OS space.

As illustrated in FIG. 1, the hierarchical manager 11 has functions of a data collecting unit (collecting unit) 11*a*, a first workload analyzer 11*b* and a movement instructing unit 11*c*.

The hierarchical manager 11 is implemented as a division/configuration change engine which includes three components such as a log pool, workload analysis and a sub LUN movement instruction on, for example, Linux. Further, the components of these log pool, workload analysis and sub LUN movement instruction realize the functions of the data collecting unit 11*a*, the first workload analyzer 11*b* and the sub LUN movement instructing unit 11*c* illustrated in FIG. 1, respectively.

The data collecting unit (collecting unit) 11*a* collects information of an IO traced for the SSD 20 or/and the HDD 30 at a predetermined interval (e.g. a one-minute interval) by using blktrace. The data collecting unit 11*a* collects information such as timestamp, Logical Block Addressing (LBA), read/write (r/w) and length by IO tracing. It is possible to find a sub LUN ID from LBA.

Further, the data collecting unit 11*a* counts the number of IOs per sub LUN based on the collected information.

The data collecting unit 11*a* counts the number of IOs in sub LUN units per fixed time interval (t). For example, when the hierarchical manager 11 performs sub LUN movement determination at the one-minute interval, this fixed time interval (t) is set to one minute.

Figure 2A:
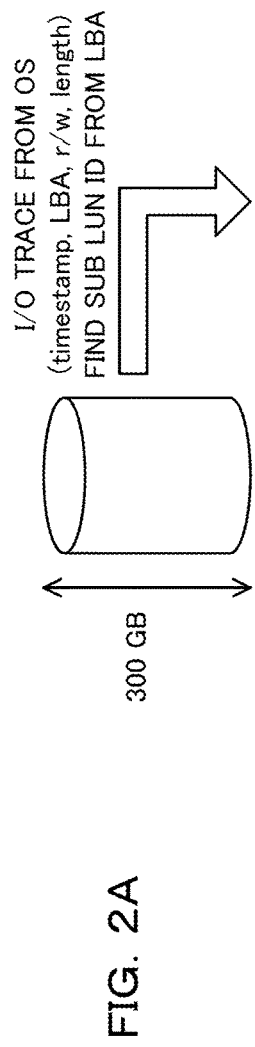
FIGS. 2A and 2B are diagrams for explaining a process of a hierarchical manager 11 of the hierarchical storage device according to the example of the embodiment.
Figure 2B:
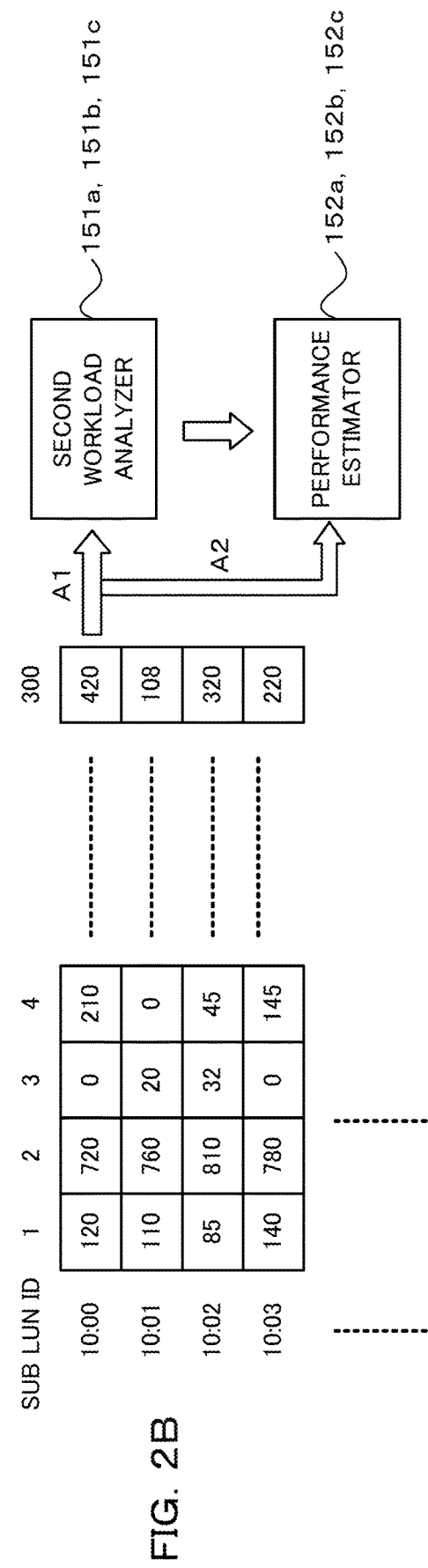

FIGS. 2A and 2B are diagrams for explaining a process of the hierarchical manager 11 of the hierarchical storage device 1 according to an example of the embodiment.

FIG. 2A illustrates that a LUN has a data size of 300 GB. FIG. 2B illustrates an example where the number of IOs produced in each of the 300 sub LUNs (sub LUN IDs=1 to 300) formed by dividing the LUN illustrated in FIG. 2A in 1 GB units is counted per minute.

For example, in the examples illustrated in FIGS. 2A and 2B, a sub LUN specified based on sub LUN ID=2 indicates that IO accesses have been made 760 times at 10:01.

The data collecting unit 11*a* writes a counting result illustrated in FIG. 2B, in a database or the like which is not illustrated. These pieces of information collected by the data collecting unit 11*a* are used by first workload analyzer 11*b*, second workload analyzers 151*a*, 151*b* and 151*c* and performance estimators 152*a*, 152*b* and 152*c* described below.

In addition, the pieces of information collected and counted by the data collecting unit 11*a* are not limited to the number of IOs, and other pieces of information may be collected. For example, the data collecting unit 11*a* may count a total number of IOs (of all segments) and an average response by targeting at all segments, and write the total number of IOs and the average response together with a timestamp in the database. Further, the data collecting unit 11*a* may count a read/write ratio (rw ratio) with respect to each segment or/and all segments, and include the read/write ratio in the above information.

Thus, the data collecting unit 11*a* is an example of a collecting unit which collects information related to an inputted IO access request for a plurality of units areas formed by dividing an area used by the SSD 20 or the HDD 30 by a predetermined size.

The first workload analyzer (first specifying unit) 11*b* selects a sub LUN whose data is moved to the SSD 20 or the HDD 30 based on the number of IOs per sub LUN collected by the data collecting unit 11*a*, and passes information related to a selected segment, to the movement instructing unit 11*c*.

An example of a sub LUN selecting method (movement determining algorithm) of the first workload analyzer 11b will be described below.

The first workload analyzer 11b uses a maximum number of sub LUNs (n), an IO rate (m), the number of continuing IO concentration (c), timeout (o) and an iops threshold (i) as parameters (input information) when sub LUN movement determination is performed.

The maximum number of sub LUNs (n) is the number of sub LUNs which are simultaneously moved between the SSD 20 and the HDD 30. As this maximum number of sub LUNs (n), the number of sub LUNs which can be moved in a fixed time interval (t) is set as a guide. When, for example, three seconds are taken to move one sub LUN in case of t=one minute, it is desirable to set about 20 to the maximum number of sub LUNs (n).

The IO rate (m) is a value used to determine whether or not it is possible to move data to the SSD 20, and indicates a rate which occupies in all IOs. When a total number of IOs of sub LUNs up to the maximum number of sub LUNs (n) in order of a greater number of IOs exceeds the IO rate (m), a sub LUN group in this maximum number of sub LUNs (n) is regarded as a movement candidate for the SSD 20.

When a high value of the IO rate (m) is set, while an effect of enhancing performance after movement of a sub LUN increases, it is difficult to move a sub LUN. Further, by contrast with this, when the value of the IO rate (m) is decreased, while the effect of enhancing performance after movement of a sub LUN decreases, a frequency to movement sub LUNs rises. The IO rate (m) is desirably set to, for example, about 60%.

The number of continuing IO concentration (c) is a value used to determine how many minutes IO concentration of a sub LUN extracted at the IO rate (m) continues. That is, the number of continuing IO concentration (c) represents continuation time information representing a time during which IO concentration of the unit area continuously occurs.

When, for example, a sub LUN whose IO concentration continues for three minutes or more is a movement target for the SSD 20, c=3 is set, whether or not the same sub LUN satisfies a condition of the IO rate (m) continuously three times and, when the condition is satisfied, a target sub LUN is moved to the SSD 20.

timeout (o) is used to move a sub LUN from the SSD 20 to the HDD 30, i.e., to determine a condition for cutting off sub LUNs from the SSD 20. When a sub LUN moved to the SSD 20 does not become an SSD movement candidate extracted by using the IO rate (m) continuously o times, the sub LUN is cut off from the SSD 20.

The iops threshold (i) is a cutoff threshold for determining whether or not to apply this movement determining algorithm. In a state where a load produced in an entire LUN is low, a great advantage cannot be expected by applying this movement determining algorithm and performing hierarchical movement. Hence, when iops of the entire LUN goes below i, this movement determining algorithm is not applied.

In case of, for example, i=50, when iops of the entire LUN is less than 50, a process related to the hierarchical movement is not performed until next data is received.

A movement determining algorithm of the first workload analyzer 11b for the SSD 20 will be described below.

First, a movement candidate extracting method of the first workload analyzer 11b for the SSD 20 will be described.

The first workload analyzer 11b extracts movement candidates for the SSD 20 by using one data in which the number of IOs has been inputted in sub LUN units.

Figure 3:
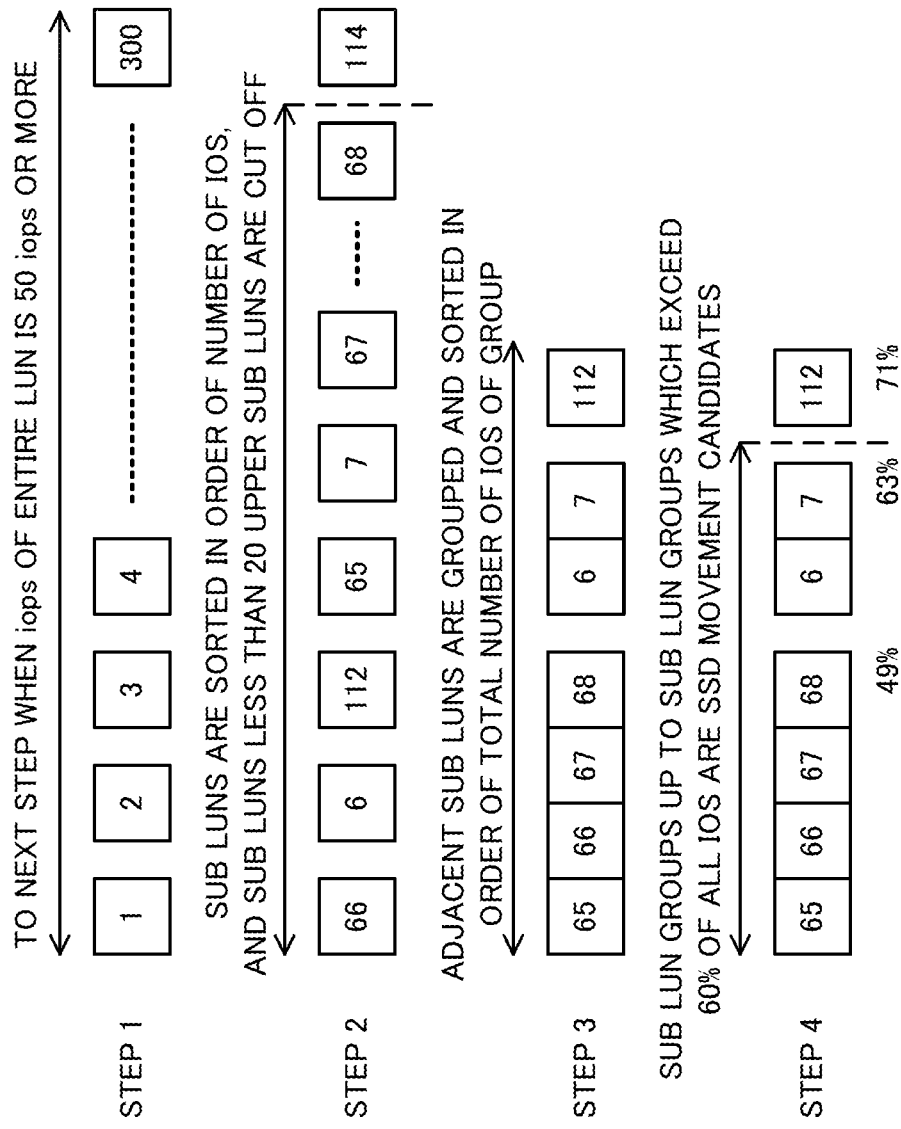
FIG. 3 is a diagram for explaining that the hierarchical storage device according to the example of the embodiment extracts movement candidates for an SSD.

FIG. 3 is a diagram for explaining that the hierarchical storage device 1 according to an example of the embodiment extracts movement candidates for the SSD 20.

An example where a LUN size is 300 GB, a sub LUN size is 1 GB and i=50 (iops), n=20 (sub LUN) and m=60(%) are set as parameters will be described with reference to this FIG. 3.

According to this method, a sub LUN which has entered a moveable range in one or two minutes in environment in which the movement determining algorithm is caused to be operated, and whose number of IOs is large is extracted, is grouped with adjacent sub LUNs and is determined as a movement candidate for the SSD 20 when the number of IOs becomes predetermined IO concentration (m=60%) or more.

The sub LUN is grouped with the adjacent sub LUNs because a load is highly likely to move in near future to surroundings of the sub LUN in which the IO concentration has occurred.

The algorithm is a method of extracting a case where an advantage is highly likely to be provided by movement and performing speculative movement instead of strictly determining an effect provided by movement to the SSD 20.

Next, a more specific process of the movement determining algorithm will be described with reference to FIG. 3. The movement determining algorithm includes processes of following steps 1 to 4.

[Step 1] When the data collecting unit 11a acquires IO number information in a given time sub LUN unit, the first workload analyzer 11b obtains iops of the entire LUN by calculating the number of IOs of the entire LUN, and dividing this value by t. FIG. 3 illustrates an example of i=50.

When the value of iops of the entire LUN goes below i, the first workload analyzer 11b finishes the process after processing this data is finished, and waits for next data. In the example illustrated in FIG. 3, iops of the entire LUN is i (=50) or more, and therefore the process moves to step 2.

[Step 2] Sub LUNs are sorted in order of a greater number of IOs for acquired data, and sub LUNs which exceed the maximum number of sub LUNs (n) are cut off. FIG. 3 illustrates an example of n=20, 20 upper sub LUNs up to sub LUN ID=68 with sub LUN ID=66 at a head are left, and sub LUNs subsequent to sub LUN ID=114 are cut off.

[Step 3] Adjacent sub LUNs among the rest of a sub LUN group are grouped. Further, the total number of IOs of respective groups are sorted. In the example illustrated in FIG. 3, in step 3, the 20 upper sub LUNs cut off in step 2 are grouped with the adjacent sub LUNs, and are sorted in order of the total number of IOs of each group.

[Step 4] The number of IOs of the sub LUN group is added, and a sub LUN group is cut off. In the example illustrated in FIG. 3, the numbers of IOs of a sub LUN group are added in order of a greater number of IOs, and, when the number of IOs exceeds 60% (=m) of all IOs, the sub LUN groups are cut off.

Next, a case where the first workload analyzer 11b performs movement for the SSD 20 will be described with reference to FIG. 4.

Figure 4:
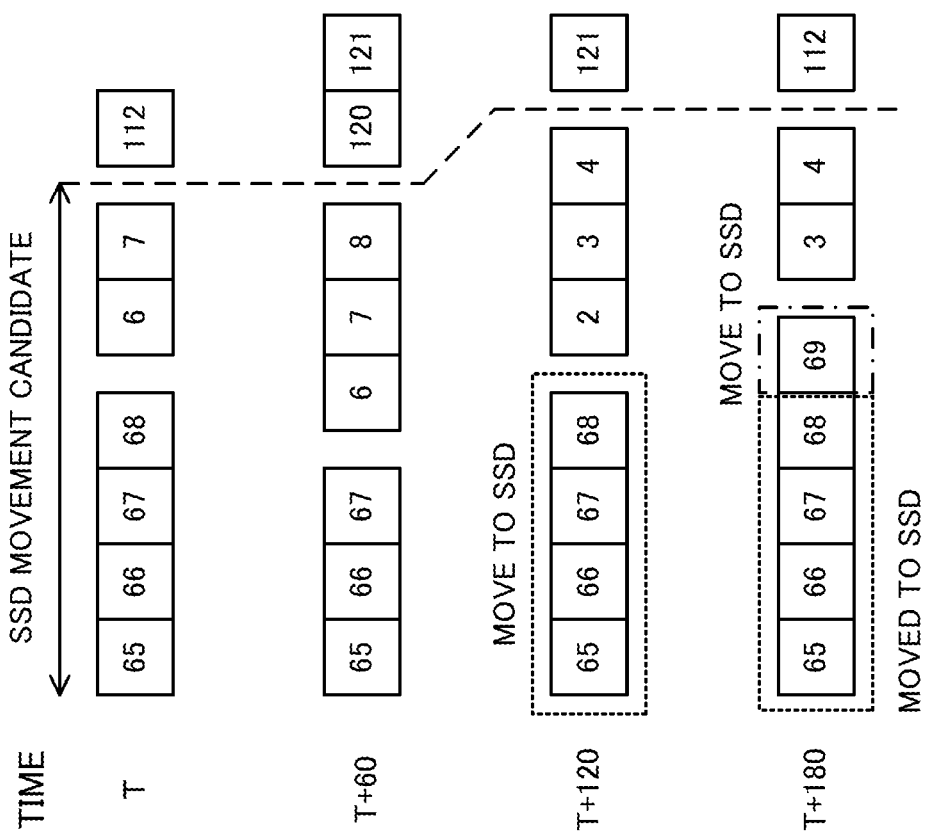
FIG. 4 is a diagram for explaining a movement determining method for the SSD of the hierarchical storage device according to the example of the embodiment.

FIG. 4 is a diagram for explaining a movement determining method for an SSD in the hierarchical storage device 1 according to the example of the embodiment. This FIG. 4 illustrates an example where a LUN size is 300 GB, a sub LUN size is 1 GB and t=60 (second) and c=3 (times) are set as parameters.

When a sub LUN group which has been determined as a movement candidate for the SSD 20 becomes a movement candidate continuously c times as described above, the first workload analyzer 11b determines the sub LUN group as a target to be moved to the SSD 20.

In the example illustrated in FIG. 4, sub LUN IDs=65, 66, 67 and 68 which have become movement candidates for the SSD 20 at a given time T are still movement candidates at a time T+60 at which next data is obtained, and at a next time T+120. That is, sub LUN groups become movement candidates continuously c=3 times at a point of the time T+120, and are moved to the SSD 20.

Sub LUN IDs do not necessarily match at the times T, T+60 and T+120 yet are regarded as loads of the same sub LUN group if there are overlapping sub LUN IDs. Further, a sub LUN group whose movement to the SSD 20 has been determined is immediately moved to the SSD 20 when subsequent data adds a new sub LUN to a sub LUN group.

In the example illustrated in FIG. 4, whether or not to move sub LUN IDs=65 to 68 to the SSD 20 at the time T+120 is determined, and sub LUN ID=69 is added to a new sub LUN group at a time T+180 and is immediately moved to the SSD 20.

Next, a case where the first workload analyzer 11b performs movement determination for the HDD 30 will be described with reference to FIGS. 5 and 6.

Figure 5:
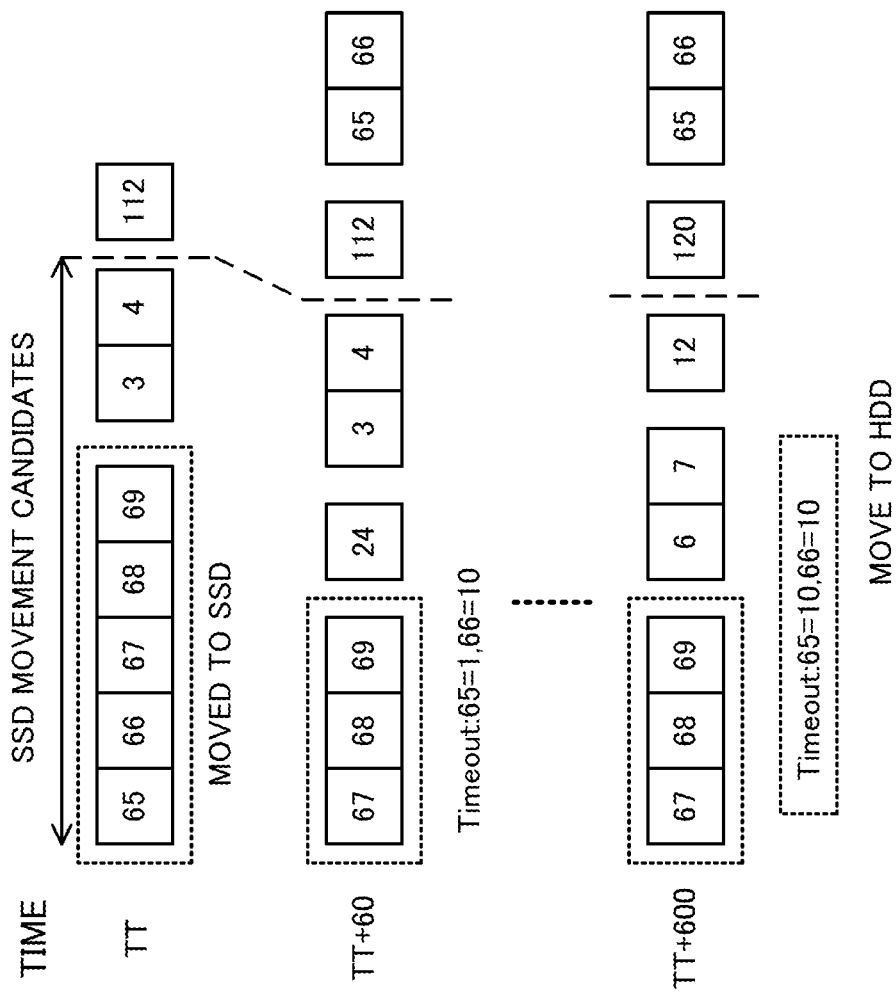
FIG. 5 is a diagram for explaining a movement determining method for an HDD of a hierarchical storage device according to the example of the embodiment.
Figure 6:
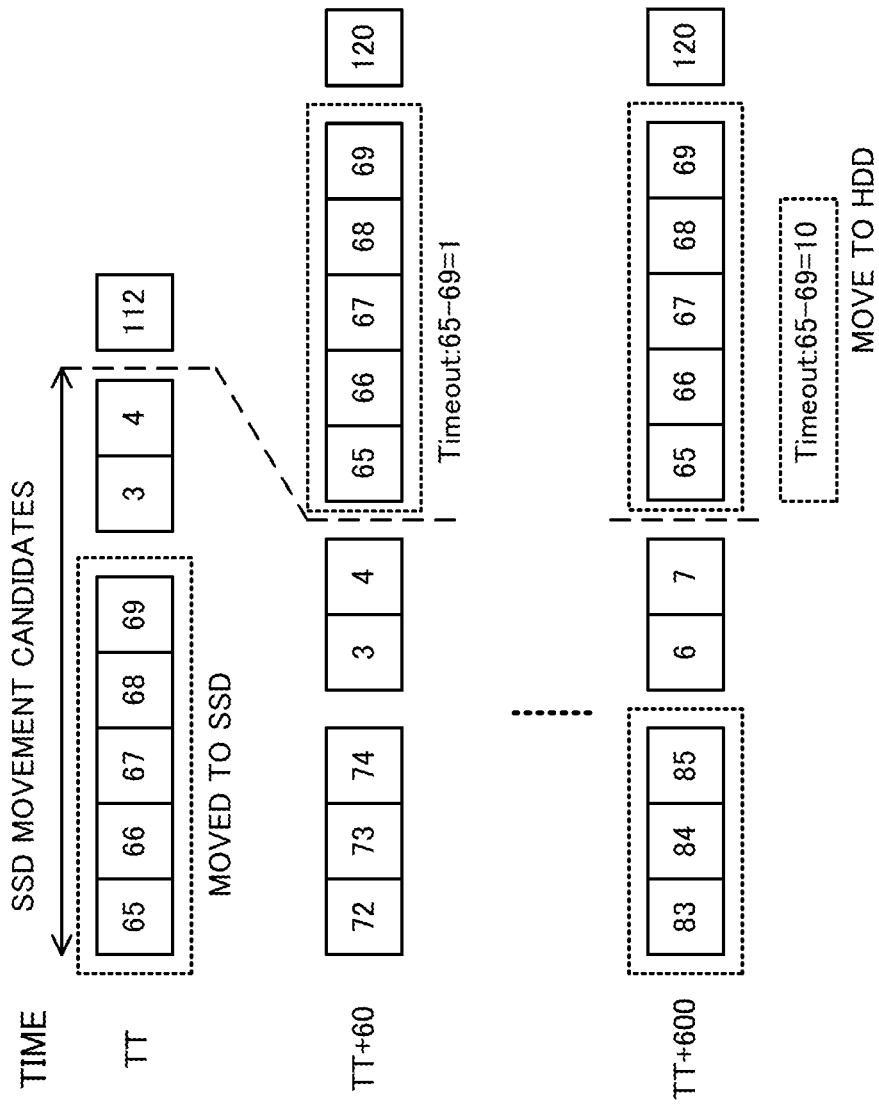
FIG. 6 is a diagram for explaining the movement determining method for the HDD of the hierarchical storage device according to the example of the embodiment.

FIGS. 5 and 6 are diagrams for explaining a method of determining movement to the HDD in the hierarchical storage device 1 according to the example of the embodiment. These FIGS. 5 and 6 illustrate examples where a LUN size is 300 GB, a sub LUN size is 1 GB and t=60 (second) and o=10 (times) are set as parameters.

Movement to the HDD 30 needs to be performed at a timing at which a load on a sub LUN group has completely converged.

Every time IO number data of a new sub LUN unit of a sub LUN group which has been moved to the SSD 20 is obtained, whether or not data is included in a sub LUN which is included in the IO rate (m) is monitored. A sub LUN which is not included in the IO rate (m) continuously timeout (o) times is moved to the HDD 30.

FIG. 5 illustrates an example where part of sub LUNs of a sub LUN group which is moved to the SSD 20 is moved to the HDD 30. The sub LUNs of the sub LUN IDs=65 and 66 are not included in the sub LUNs which meet the IO rate (m) continuously ten times, and are moved to the HDD 30.

Further, in FIG. 6, the sub LUN group including sub LUN IDs 65 to 69 is not included in sub LUNs included in the IO rate (m) continuously ten times, and is moved to the HDD 30.

A combination of parameters of the above-described maximum number of sub LUNs (n), IO rate (m), the number of continuing IO concentration (c), timeout (o) and iops threshold (i) used for sub LUN movement determination will be referred to as a parameter set. Further, particularly, a parameter set used for the sub LUN movement determination by the first workload analyzer 11b will be referred to as a first parameter set.

As described above, the first workload analyzer 11b functions as a first specifying unit (11b) which specifies a movement target area (sub LUN) of the HDD 30 in which data is moved to the SSD 20 by using a first parameter (first parameter set) based on the number of IOs (access information) collected by the data collecting unit 11a.

The movement instructing unit 11c instructs the hierarchical driver 12 to move data of a selected sub LUN from the HDD 30 to the SSD 20 or from the SSD 20 to the HDD 30 based on the instruction from the first workload analyzer 11b. In this case, the movement instructing unit 11c may convert an offset on a storage volume of the selected sub LUN, into an offset on the HDD 30, and instruct movement of data per sub LUN. When, for example, a sector size of the HDD 30 is 512 B, if the offset on the volume is 1 GB, the offset on the HDD 30 is 1×1024×1024×1024/512=2097152.

Thus, the movement instructing unit 11c functions as a movement processor which moves to the SSD 20 data of a movement target area of the HDD 30 specified by the first workload analyzer 11b.

The parameter evaluating unit 15 evaluates a plurality of parameter sets (parameters) by using statistical data collected by the data collecting unit 11a, and determines an optimal parameter set based on this evaluation result.

The parameter evaluating unit 15 evaluates a plurality of parameter sets including a parameter set (first parameter set: first parameter) used for sub LUN movement determination by the first workload analyzer 11b. More specifically, the parameter evaluating unit 15 determines a sub LUN moved per parameter set by applying a plurality of these parameter sets to the same sub LUN movement determining method as that of the above-described first workload analyzer 11b.

In the example illustrated in FIG. 1, the parameter evaluating unit 15 includes the second workload analyzers 151a, 151b and 151c, the performance estimators 152a, 152b and 152c and a parameter determining unit 153.

The second workload analyzers 151a, 151b and 151c determine (specify) sub LUNs to be moved between the SSD 20 and the HDD 30 by applying different parameter sets to the same sub LUN movement determining method (movement determining algorithm) as that of the above-described first workload analyzer 11b.

The second workload analyzers 151a, 151b and 151c each receive an input of the number of IOs per sub LUN collected by the data collecting unit 11a.

The second workload analyzer 151a determines a candidate sub LUN to be moved between the SSD 20 and the HDD 30 by applying the same first parameter set as that of the first workload analyzer 11b to the movement determining algorithm.

The second workload analyzer 151b determines a candidate sub LUN to be moved between the SSD 20 and the HDD 30 by applying a parameter set (second parameter set) different from that of the second workload analyzer 151a to the movement determining algorithm.

The second workload analyzer 151c determines a candidate sub LUN to be moved between the SSD 20 and the HDD 30 by applying a parameter set (third parameter set) different from those of the second workload analyzer 151a and the second workload analyzer 151b to the movement determining algorithm.

That is, the second workload analyzers 151a, 151b and 151c specify candidate sub LUNs (movement target area candidates) in which data is moved between the HDD 30 and the SSD 20 per parameter by using a plurality of parameters (first to third parameter sets) based on the access information collected by the data collecting unit 11a.

Further, the second workload analyzers 151a, 151b and 151c each output information (sub LUN ID) indicating a sub LUN to be moved to the SSD 20 on a regular basis (e.g. every minute).

A sub LUN ID of a movement target sub LUN determined by the second workload analyzer 151a is notified to the performance estimator 152a. Similarly, a sub LUN ID of a movement target sub LUN determined by the second workload analyzer 151b is notified to the performance estimator 152b, and a sub LUN ID of a movement target sub LUN determined by the second workload analyzer 151c is notified to the performance estimator 152c.

Further, the performance estimator 152a, 152b and 152c evaluate the sub LUNs determined by the second workload analyzers 151a, 151b and 151c.

In the example illustrated in FIG. 1, by applying three types of parameter sets including the first parameter set as described above to the above-described movement determining algorithm, a sub LUN to be moved between the SSD 20 and the HDD 30 is determined.

For example, a parameter obtained by making a value of a given parameter (e.g. the number of continuing IO concentration (c)) larger than the first parameter set among a plurality of parameters included in the first parameter set is used as a second parameter set. Further, a parameter obtained by making a value of a given parameter (e.g. the number of continuing 10 concentration (c)) larger than the first parameter set among a plurality of parameters included in the first parameter set is used as a third parameter set. For other parameters of these second parameter set and third parameter set, the same parameter as the first parameter can be used.

For example, to enhance performance of the hierarchical storage device 1, it is effective to select a sub LUN on which a load has concentrated for a long period of time and move the sub LUN to the SSD 20.

Hence, based on as a key a continuation time of load concentration which has occurred in the sub LUN, movement determination for the SSD 20 is performed. For example, movement to the SSD 20 is instructed with an expectation that, for a long period of time, a load further concentrates on a sub LUN on which a load concentrates for three minutes. The number of continuing parameter 10 concentration (c) is used to make "three minutes" which are used as this reference value longer or shorter.

By making the reference value longer than three minutes, a risk that a load which comes to an end in a short period of time moves to the SSD 20 decreases. However, a time required for movement determination for the SSD 20 becomes long, and a performance enhancement effect becomes little accordingly. Hence, it is important to determine an optimal value as the reference value.

Reference numerals 151a to 151c will be used as reference numerals indicating the second workload analyzers when it is necessary to specify one of a plurality of second workload analyzers. However, reference numeral 151 will be used to indicate an arbitrary second workload analyzer.

The number of the second workload analyzers 151 is the same as the number of parameter sets which are evaluated.

In addition, an example where the number of continuing IO concentration (c) among parameter sets is changed and evaluated has been described above. However, the present embodiment is not limited to this and can be variously deformed and carried out. For example, instead of the number of continuing IO concentration (c), the IO rate (m) or the maximum number of sub LUNs (n) may be changed. Further, two or more parameters among parameters included in a parameter set may be changed, or parameters other than the maximum number of sub LUNs (n), the IO rate (m) and the number of continuing IO concentration (c) may be changed.

Furthermore, an example where three parameter sets, i.e. first to third parameter sets, are evaluated have been described in the above example. However, the present embodiment is not limited to this, and four or more parameters may be evaluated. The number of parameter sets to be evaluated can be increased by providing the four or more second workload analyzers 151 whose number corresponds to the number of these parameters.

By, for example, reducing, keeping or increasing the three parameters of the maximum number of sub LUNs (n), the IO rate (m) and the number of continuing IO concentration (c) based on the first parameter set, it is possible to simultaneously evaluate 3×3×3=27 types of parameter sets. In such a case, the 27 second workload analyzers 151 are provided.

The performance estimators 152a, 152b and 152c estimate IO performance of each sub LUN notified as a sub LUN moved from each workload analyzer 151 to the SSD 20 in case where the sub LUN is moved to the SSD 20.

In addition, reference numerals 152a, 152b and 152c will be used as reference numerals indicating performance estimators when it is necessary to specify one of a plurality of performance estimators. However, reference numeral 152 will be used to indicate an arbitrary performance estimator.

The performance estimator 152a receives an input of information (sub LUN ID) for specifying a sub LUN determined as a sub LUN to be moved to the SSD 20 by the second workload analyzer 151a. Similarly, the performance estimator 152b receives an input of a sub LUN ID of a sub LUN determined as a sub LUN to be moved to the SSD 20 by the second workload analyzer 151b. Further, the performance estimator 152c receives an input of a sub LUN ID of a sub LUN determined as a sub LUN to be moved to the SSD 20 by the second workload analyzer 151c.

Furthermore, the performance estimators 152a, 152b and 152c each receive an input of the number of IOs of each sub LUN collected by the data collecting unit 11a.

The performance estimator 152 counts (counts the number) the number of IOs per sub LUN notified from the second workload analyzer 151 by using the number of IOs per sub LUN inputted from the data collecting unit 11a.

If each sub LUN notified from the second workload analyzer 151 is moved to the SSD 20, an IO to the sub LUN causes a hit (SSD hit) in the SSD 20. The performance estimator 152 estimates (counts the number) the number of SSD hits occurring in the SSD 20 in case where each sub LUN notified from the second workload analyzer 151 as described is moved to the SSD 20.

The performance estimator 152 can learn which sub LUN causes an SSD hit per time when the sub LUN is moved to the SSD 20 by cross-checking the number of IOs in sub LUN units collected at a fixed time interval (t: for example, t=1 minute) by the data collecting unit 11a and a sub LUN ID of each sub LUN moved to the SSD 20 notified by the second workload analyzer 151, and can calculate how much the number of SSD hits is.

FIG. 7 is a diagram illustrating an example of information counted by the performance estimator 152 in the hierarchical storage device 1 according to the example of the embodiment. An example where the number of IOs occurring in each sub LUN (sub LUN IDs=1 to 300) is counted per minute will be described with reference to this FIG. 7.

In the example illustrated in this FIG. 7, the second workload analyzer 151 determines to move a sub LUN of sub LUN ID=2 to the SSD 20 at time 10:00. In this regard, as illustrated in FIG. 7, IOs occur 720 times in the sub LUN of sub LUN ID=2 at 10:00.

The movement instructing unit 111c can regard this number of IOs as the number of times of SSD hits when this sub LUN of sub LUN ID=2 is moved to the SSD 20.

Further, even when a movement instruction of moving the sub LUN of this sub LUN ID=2 to the SSD 20 is not issued at 10:01, the sub LUN of this sub LUN ID=2 has already been moved to the SSD 20 (has already loaded up to the SSD). Hence, IOs occurring 760 times at 10:01 can also be regarded as the number of times of SSD hits.

The performance estimators 152a to 152c each accumulate the number of IOs which are regarded as SSD hits in each time zone. Thus, a cumulative value of the number of IOs which are regarded as SSD hits per parameter set (the first parameter set to the third parameter set).

The performance estimators 152a to 152c store in a storage area such as a memory 10b (see FIG. 6) a cumulative value of the number of IOs which are regarded as SSD hits per calculated parameter set. The cumulative value of these numbers of IOs stored in the memory 10b or the like is read by the parameter determining unit 153 described below. That is, the performance estimator 152 notifies the parameter determining unit 153 of the cumulative value of the number of IOs which are regarded as SSD hits per calculated parameter set.

In addition, the performance estimator 152 outputs the cumulative value of the number of IOs which are regarded as SSD hits to the parameter determining unit 153, and, at the same time, resets the cumulative value and newly accumulates the numbers of IOs.

As described above, in parallel to determination made on a movement candidate sub LUN by the first workload analyzer 11b, the parameter evaluating unit 15 virtually determines data movement candidate sub LUNs between the SSD 20 and the HDD 30 by using a plurality of types of parameters, and simulates performance.

The parameter determining unit 153 reads the cumulative value of the number of IOs which are regarded as SSD hits per parameter set calculated by the performance estimator 152, per predetermined interval (e.g. per hour) from the storage area such as the memory 10b.

Further, the parameter determining unit 153 compares the cumulative values of the numbers of IOs which are regarded as SSD hits, and determines as a recommended parameter a parameter set whose cumulative value of the number of IOs which are regarded as SSD hits is maximum.

The hierarchical storage device 1 has higher response performance to an IO request when the number of IOs which are regarded as SSD hits is larger, and can efficiently exhibit device performance.

The parameter determining unit 153 updates the first parameter set used by the first workload analyzer 11b of the hierarchical manager 11 by using the determined recommended parameter set. Consequently, the first workload analyzer 11b sets a parameter set which can be expected to increase an SSD hit rate, so that it is possible to efficiently exhibit device performance.

The parameter determining unit 153 notifies the first workload analyzer 11b of the determined recommended parameter set, and instructs the first workload analyzer 11b to change the first parameter set.

The first workload analyzer 11b compares the notified recommended parameter set and the first parameter set, and updates the first parameter set by using the recommended parameter set when the recommended parameter set and the first parameter set are different.

The hierarchical driver 12 includes an IO mapper 12a, a hierarchical table 12b and a temporary buffer 12c.

The IO mapper 12a sorts a user's IO request for a storage volume to the SSD driver 13 or the HDD driver 14 by using the hierarchical table 12b, and returns an IO response from the SSD driver 13 or the HDD driver 14 to the user.

The temporary buffer 12c is a holding unit which temporarily stores an IO request, and is realized by a memory or the like which is not illustrated. When an IO request is issued to a sub LUN during hierarchical movement, the IO mapper 12a stores the IO request in the temporary buffer 12c and suspends the IO request until movement of data of the sub LUN is finished. When the movement of the data is finished, the IO mapper 12a reads the IO request from the temporary buffer 12c, and resumes sorting the IO request to the SSD driver 13 or the HDD driver 14.

The hierarchical table 12b is a table which is used for hierarchical control performed by sorting an IO request by the IO mapper 12a, and is realized by a memory or the like which is not illustrated.

The hierarchical table 12b is a table which associates and stores an SSD offset, an HDD offset and a state per, for example, segment in which data is moved to the SSD 20. In addition, the hierarchical table 12b is known and therefore will not be described in detail.

The IO mapper 12a can determine to which one of the SSD driver 13 and the HDD driver 14 an IO request is sorted, by referring to the above-described hierarchical table 12b, and determine whether or not the IO request is moved in a segment.

Back to FIG. 1, when receiving a sub LUN movement instruction (segment movement instruction) from the movement instructing unit 11c, the hierarchical driver 12 executes a movement process of moving to the SSD 20 or the HDD 30 data stored in a movement target unit area of the HDD 30 or the SSD 20. More specifically, the hierarchical driver 12 moves data of the sub LUN specified according to the sub LUN movement instruction by the hierarchical table 12b, between the SSD 20 and the HDD 30.

In addition, this hierarchical driver 12 can move data between the SSD 20 and the HDD 30 by a known method, and this data movement will not be described.

The SSD driver 13 controls an access to the SSD 20 based on an instruction of the hierarchical driver 12. The HDD driver 14 controls an access to the HDD 30 based on the instruction of the hierarchical driver 12.

[2] Hardware Configuration Example

Figure 8:
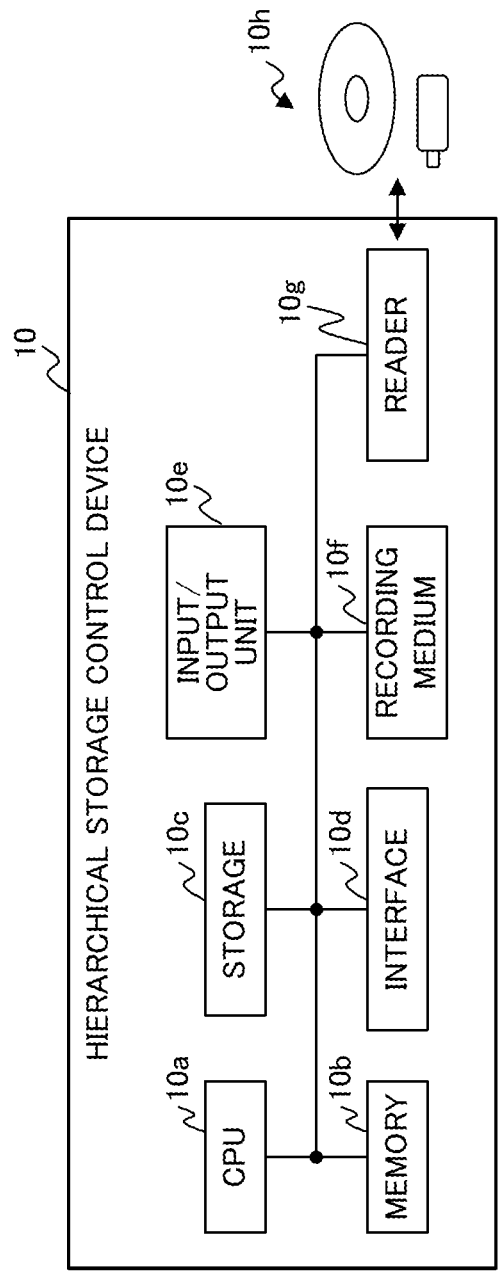
FIG. 8 is a diagram illustrating a hardware configuration example of the hierarchical storage device.
Figure 9:
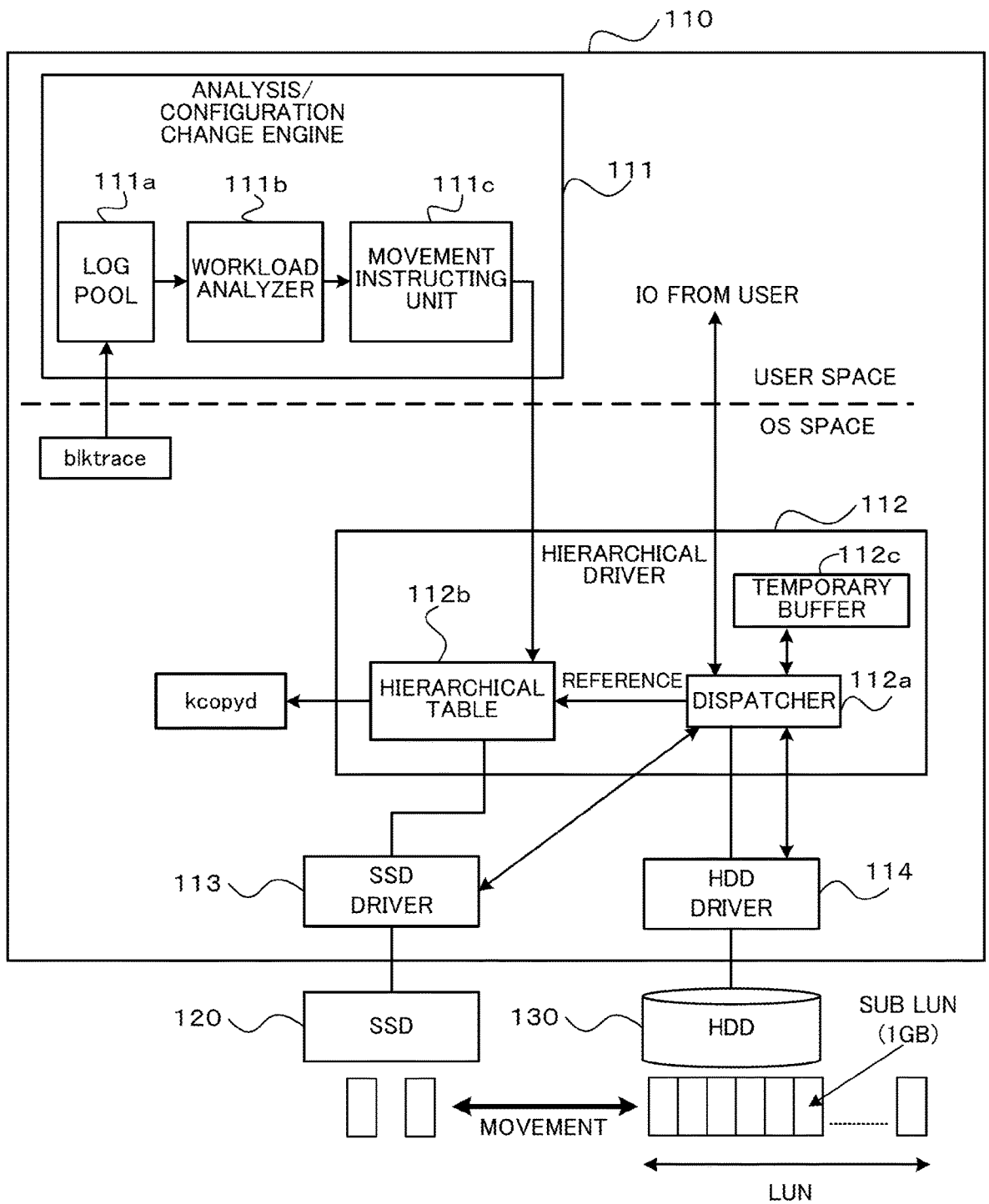
FIG. 9 is a diagram for explaining OTF-AST.

Next, a hardware configuration of the hierarchical storage control device 10 illustrated in FIG. 1 will be described with reference to FIG. 8. FIG. 8 is a diagram illustrating a hardware configuration example of the hierarchical storage control device 10 illustrated in FIG. 1.

As illustrated in FIG. 8, the hierarchical storage control device 10 includes a Central Processing Unit (CPU) 10a, the memory 10b, a storage 10c, an interface 10d, an input/output unit 10e, a recording medium 10f and a reader 10g.

The CPU 10a is a computation processing device (processor) which is connected with each of the corresponding blocks 10b to 10g, and performs various types of control and computation. The CPU 10a realizes various functions of the hierarchical storage control device 10 by executing programs stored in the memory 10b, the storage 10c, the recording medium 10f, a recording medium 10h and a Read Only Memory (ROM) which is not illustrated.

The memory 10b is a storage device which stores various items of data and programs. The CPU 10a stores data and programs in the memory 10b to expand when executing a program. In addition, the memory 10b is, for example, a non-volatile memory such as a Random Access Memory (RAM).

The storage 10c is hardware which stores various items of data and programs. The storage 10c includes various devices including a magnetic disk device such as an HDD, a semiconductor drive device such as an SSD and a non-volatile memory such as a flash memory. In addition, a plurality of devices may be used for the storage 10c, and these devices may configure a Redundant Arrays of Inexpensive Disks (RAID). Further, the storage 10c may include the SSD 20 and the HDD 30 illustrated in FIG. 1.

The interface 10d controls connection and communication between a network (not illustrated) and another information processing device via a wire or by radio. The interface 10d is, for example, an adaptor which complies with a Local Area Network (LAN), a fibre channel (FC) and an InfiniBand.

The input/output unit 10e can include at least one of an input device such as a mouse or a keyboard, or an output device such as a display or a printer. For example, the input/output unit 10e is used for various operations by a user or a manager of the hierarchical storage control device 10.

The recording medium 10f is a storage device such as a flash memory or a ROM, and can store various items of data and programs. The reader 10g is a device which reads items of data and programs recorded in the computer-readable recording medium 10h. In at least one of the recording media 10f and 10h, a control program which realizes all or part of various functions of the hierarchical storage control device 10 according to the present embodiment may be stored. For example, the CPU 10a can expand a program read from the recording medium 10f or the recording medium 10h via the reader 10g, to the storage device such as the memory 10b to execute. Consequently, a computer (including the CPU 10a, the information processing device and various terminals) can realize the functions of the above-described hierarchical storage control device 10.

In addition, the recording medium 10h includes optical disks including flexible disks, Compact Disc (CDs), Digital Versatile Disc (DVDs) and Blu-ray discs, or flash memories such as a Universal Serial Bus (USB) memory and an SD card. In addition, the CDs include a CD-ROM, a CD-Recordable (CD-R) and a CD-Rewritable (CD-RW). Further, the DVDs include a DVD-ROM, a DVD-RAM, a DVD-R, a DVD-RW, a DVD+R and a DVD+RW.

In addition, the above-described blocks 10a to 10g are connected via a bus to connect with each other. For example, the CPU 10a and the storage 10c are connected via a disk interface. Further, the above-described hardware configuration of the hierarchical storage control device 10 is an illustrative configuration. Hence, the hardware in the hierarchical storage control device 10 may be increased or decreased (by, for example, adding or omitting arbitrary blocks), divided or integrated in arbitrary combination, and a bus may be optionally added or omitted.

[3] Operation

A process in the hierarchical storage control device 10 according to the example of the embodiment which is configured as described above will be described.

(1) Process of Hierarchical Manager 11

When a host device or the like which is not illustrated makes an IO access request to a LUN, the hierarchical manager 11 performs the following process.

That is, the data collecting unit 11a of the hierarchical manager 11 collects an IO trace at a predetermined interval (one-minute interval in the present embodiment) by using blktrace. The data collecting unit 11a counts the number of IOs per sub LUN in each minute unit based on information collected by this IO trace (see FIG. 2B).

The first workload analyzer 11b selects a sub LUN whose data is moved to the SSD 20 or the HDD 30 based on the number of IOs per sub LUN collected by the data collecting unit 11a.

The first workload analyzer 11b performs sub LUN movement determination by using the first parameter set to which the maximum number of sub LUNs (n), the IO rate (m), the number of continuing IO concentration (c), timeout (o) and the iops threshold (i) have been set in the above-described movement determination algorithm.

The first workload analyzer 11b passes to the movement instructing unit 11c a sub LUN ID for specifying a sub LUN selected by the movement determining algorithm.

The movement instructing unit 11c instructs the hierarchical driver 12 to move data of the selected sub LUN from the HDD 30 to the SSD 20 or to move the data from the SSD 20 to the HDD 30 based on an instruction from the first workload analyzer 11b.

(2) Process of Parameter Evaluating Unit 15

The parameter evaluating unit 15 also receives information of the number of IOs of each sub LUN collected by the data collecting unit 11a. Further, in parallel to the process of the above-described hierarchical manager 11, this parameter evaluating unit 15 evaluates a plurality of parameters.

Information of the number of IOs of each sub LUN collected by the data collecting unit 11a is inputted to each second workload analyzer 151 (151a, 151b and 151c) (see arrow A1 in FIG. 2B).

The second workload analyzer 151a determines a sub LUN moved between the SSD 20 and the HDD 30 by applying the same first parameter set as that of the first workload analyzer 11b to the movement determining algorithm. The second workload analyzer 151a notifies the performance estimator 152a of the sub LUN ID of the determined movement target sub LUN.

The performance estimator 152a counts the number of IOs per sub LUN notified from the second workload analyzer 151a by using the number of IOs per sub LUN inputted from the data collecting unit 11a (see arrow A2 in FIG. 2B).

The performance estimator 152a stores in a storage area such as the memory 10b (see FIG. 8) a cumulative value of the numbers of IOs which are regarded as SSD hits per calculated parameter set.

The second workload analyzer 151b determines a sub LUN to be moved between the SSD 20 and the HDD 30 by applying the second parameter set different from that of the second workload analyzer 151a to the movement determining algorithm.

The second workload analyzer 151b notifies the performance estimator 152b of a sub LUN ID of the determined movement target sub LUN.

The performance estimator 152b counts each number of IOs per sub LUN notified from the second workload analyzer 151b by using the number of IOs per sub LUN inputted from the data collecting unit 11a (see arrow A2 in FIG. 2B).

The performance estimator 152b stores in the storage area such as the memory 10b (see FIG. 8) a cumulative value of the numbers of IOs which are regarded as SSD hits per calculated parameter set.

The second workload analyzer 151c determines a sub LUN to be moved between the SSD 20 and the HDD 30 by applying the third parameter set different from those of the second workload analyzer 151a and the second workload analyzer 151b to the movement determining algorithm.

The second workload analyzer 151c notifies the performance estimator 152c of the sub LUN ID of the determined movement target sub LUN.

The performance estimator 152c counts each number of IOs per sub LUN notified from the second workload analyzer 151c by using the number of IOs per sub LUN inputted from the data collecting unit 11a (see arrow A2 in FIG. 2B).

The performance estimator 152c stores in the storage area such as the memory 10b (see FIG. 6) a cumulative value of the numbers of IOs which are regarded as SSD hits per calculated parameter set.

The parameter determining unit 153 reads the cumulative value of the numbers of IOs which are regarded as SSD hits per parameter set calculated by the performance estimators 152a, 152b and 152c, from the storage area such as the memory 10b per predetermined interval (e.g. per hour).

Further, the parameter determining unit 153 compares cumulative values of numbers of IOs which are regarded as SSDs, and determines a parameter set whose cumulative value of the number of IOs which are regarded as SSDs is maximum as a recommended parameter set.

The parameter determining unit 153 updates the first parameter set used by the first workload analyzer 11b of the hierarchical manager 11 by using the determined recommended parameter set. Consequently, the first workload analyzer 11b sets a parameter set which can be expected to increase an SSD hit rate. Consequently, it is possible to efficiently exhibit device performance.

The parameter determining unit 153 notifies the first workload analyzer 11b of the determined recommended parameter set, and instructs the first workload analyzer 11b to change the first parameter set.

The first workload analyzer 11b compares the notified recommended parameter set and the first parameter set, and updates the first parameter set by using the recommended parameter set when the recommended parameter set and the first parameter set are different.

[4] Effect

In the hierarchical manager 11 of the hierarchical storage device 1 according to the example of the embodiment, the first workload analyzer 11b selects a sub LUN whose data is moved to the SSD 20 or the HDD 30, and the movement instructing unit 11c instructs the hierarchical driver 12 to move data of a sub LUN and the parameter evaluating unit 15 evaluates a plurality of parameter sets in parallel.

That is, by applying a plurality of types of parameter sets including the first parameter set used by the first workload analyzer 11b, to the movement determining algorithm, a plurality of second workload analyzers 151 determines a sub LUN to be moved by the SSD 20 and the HDD 30.

Further, for a movement target sub LUN determined by using each parameter set, a plurality of performance estimators 152 calculates a cumulative value of the number of IOs which are regarded as SSD hits per parameter set by using the number of IOs per sub LUN inputted from the data collecting unit 11a.

The parameter determining unit 153 compares the cumulative values of the numbers of IOs which are regarded as SSD hits, and determines a parameter set whose cumulative value of the number of IOs which are regarded as SSD hits is maximum as the recommended parameter set. Further, the first parameter set used by the first workload analyzer 11b is updated by using this recommended parameter set.

Thus, the first workload analyzer 11b uses the parameter set (recommended parameter set) such that a sub LUN which increases an SSD hit rate is selected. Consequently, it is possible to efficiently operate the SSD 20 and enhance performance of the hierarchical storage device 1. Further, it is possible to perform an OTF-AST operation corresponding to a workload state.

[5] Others

Further, the embodiment is not limited to the above, and can be variously deformed and carried out without departing from the spirit of the present embodiment.

For example, the hierarchical storage device 1 in which the SSD 20 and the HDD 30 are used has been described in one embodiment. The present invention is not limited to this, and is applied likewise to, for example, the hierarchical storage system in which a cache memory and a main storage device are used, too. That is, the present invention is applicable not only to the hierarchical storage system of the non-volatile storage device but also likewise to the hierarchical storage system including a non-volatile memory device, too.

Further, the hierarchical storage device 1 according to one embodiment is applicable to storage devices having a difference in speeds, too, in addition to the SSD 20 and the HDD 30. For example, the hierarchical storage device 1 is applicable to a hierarchical storage device or the like in which an HDD and a magnetic recording device such as a tape drive having a larger volume and a lower speed than the HDD are used.

Further, according to one embodiment, the operation of the hierarchical storage control device 10 has been described focusing on one SSD 20 and one HDD 30. However, the same applies when a plurality of SSDs 20 and a plurality of HDDs 20 are provided in the hierarchical storage devices 1 and 1A.

Furthermore, an example where the hierarchical storage control device 10 uses a Linux device-mapper function has been described in the above-described embodiment. The hierarchical storage control device 10 is not limited to this. For example, the hierarchical storage control device 10 may use another volume management driver or another OS function and can be variously deformed and carried out.

Further, the present embodiment can be carried out and manufactured by one of ordinary skill in the art based on the above-described disclosure.

According to one embodiment, it is possible to efficiently operate a storage device of a hierarchical storage device, and enhance device performance.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A non-transitory computer-readable recording medium having a hierarchical storage control program recorded thereon, the hierarchical storage control program causing a computer that is connected with a first storage device, and a second storage device that has higher data access performance than data access performance of the first storage device to execute a process comprising:

collecting access information related to each of a plurality of unit areas included in the first storage device;

specifying a movement target area in which data is moved between the first storage device and the second storage device, by applying a first parameter set based on the collected access information to a movement determining algorithm;

moving, to the second storage device, data of the movement target area of the specified first storage device;

specifying a movement target area candidate in which data is moved between the first storage device and the second storage device for each of a plurality of second parameter sets by applying each of the plurality of second parameter sets to the movement determining algorithm based on the collected access information;

counting a number of occurrences of data accesses to the movement target area candidate specified for each of the plurality of second parameter sets based on the collected access information; and determining, as a recommended parameter set, the parameter set whose cumulative value of the counted number of occurrences of data accesses is the largest by comparing cumulative values of the number of occurrences of data accesses of the plurality of second parameter sets, and updating the first parameter set to the recommended parameter set, each of the first parameter set and the plurality of second parameter sets includes a number of continuing IO concentration that represents a time period during which IO is continuously concentrated on each of the unit areas, a predetermined upper limit number of the movement target areas in which the data is simultaneously moved between the first storage device and the second storage device, and an IO rate that represents a rate of accesses that have occurred in each of the plurality of unit areas to the total accesses that have occurred in the plurality of unit areas;

when a total number of accesses of unit areas up to the predetermined upper limit in order of a greater number of accesses exceeds the IO rate, two or more unit areas in the predetermined upper limit are set to be movement candidates for the second storage device; and a unit area that has been set as one of the movement candidates a number of continuous times as many as the number of continuing IO concentration is specified as one of the movement target areas.

2. The non-transitory computer-readable recording medium according to claim 1, wherein the process further comprises:

extract one or more unit areas having a number of occurrences of data accesses equal to or larger than a threshold among the plurality of unit areas by sorting the unit areas in order of having a larger number of occurrences of data accesses;

generate adjacent unit area groups by grouping adjacent unit areas among the extracted unit areas; and extract one or more of the plurality of adjacent unit area groups having a total number of occurrences of data accesses equal to or larger than a threshold by calculating a total number of occurrences of data accesses of each of the plurality of adjacent groups through adding the number of accesses to each of the unit areas included in the adjacent unit area group and by sorting the plurality of adjacent unit area groups in order of having a larger total number of accesses.

3. A hierarchical storage control method of a hierarchical storage control device that is connected with a first storage device, and a second storage device that has higher data access performance than data access performance of the first storage device, the hierarchical storage control method comprising:

collecting access information related to each of a plurality of unit areas included in the first storage device;

specifying a movement target area in which data is moved between the first storage device and the second storage device, by applying a first parameter set based on the collected access information to a movement determining algorithm;

moving, to the second storage device, data of the movement target area of the specified first storage device;

specifying a movement target area candidate in which data is moved between the first storage device and the second storage device for each of a plurality of second parameter sets by applying each of the plurality of second parameter sets to a movement determining algorithm based on the collected access information;

counting a number of occurrences of data accesses to the movement target area candidate specified for each of the plurality of second parameter sets based on the collected access information; and determining, as a recommended parameter set the parameter set whose cumulative value of the counted number of occurrences of data accesses is the largest by comparing cumulative values of the number of occurrences of data accesses of the plurality of second parameter sets, and updating the first parameter set to the recommended parameter set, each of the first parameter set and the plurality of second parameter sets includes a number of continuing IO concentration that represents a time period during which IO is continuously concentrated on each of the unit areas, a predetermined upper limit number of the movement target areas in which the data is simultaneously moved between the first storage device and the second storage device, and an IO rate that represents a rate of accesses that have occurred in each of the plurality of unit areas to the total accesses that have occurred in the plurality of unit areas;

when a total number of accesses of unit areas up to the predetermined upper limit in order of a greater number of accesses exceeds the IO rate, two or more unit areas in the predetermined upper limit are set to be movement candidates for the second storage device; and a unit area that has been set as one of the movement candidates a number of continuous times as many as the number of continuing IO concentration is specified as one of the movement target areas.

4. The hierarchical storage control method according to claim 3, further comprising:

extracting one or more unit areas having a number of occurrences of data accesses equal to or larger than a threshold among the plurality of unit areas by sorting the unit areas in order of having a larger number of occurrences of data accesses;

generating adjacent unit area groups by grouping adjacent unit areas among the extracted unit areas; and extracting one or more of the plurality of adjacent unit area groups having a total number of occurrences of data accesses equal to or larger than a threshold by calculating a total number of occurrences of data accesses of each of the plurality of adjacent groups through adding the number of accesses to each of the unit areas included in the adjacent unit area group and by sorting the plurality of adjacent unit area groups in order of having a larger total number of accesses.

5. A hierarchical storage device comprising:

a first storage device;

a second storage device that has higher data access performance than data access performance of the first storage device; and a processor configured to:

collect access information related to each of a plurality of unit areas included in the first storage device;

specify a movement target area in which data is moved between the first storage device and the second storage device, by applying a first parameter set based on the collected access information to a movement determining algorithm;

move, to the second storage device, data of the movement target area of the specified first storage device;

specify a movement target area candidate in which data is moved between the first storage device and the second storage device for each of a plurality of second parameter sets by applying each of the plurality of second parameter sets to the movement determining algorithm based on the collected access information;

count a number of occurrences of data accesses to the movement target area candidate specified for each of the plurality of second parameter sets by the second specifying unit, based on the collected access information; and determine, as a recommended parameter set, the parameter set whose cumulative value of the counted number of occurrences of data accesses is the largest by comparing cumulative values of the number of occurrences of data accesses of the plurality of second parameter sets, and update the first parameter set to the recommended parameter, each of the first parameter set and the plurality of second parameter sets includes a number of continuing IO concentration that represents a time period during which IO is continuously concentrated on each of the unit areas, a predetermined upper limit number of the movement target areas in which the data is simultaneously moved between the first storage device and the second storage device, and an IO rate that represents a rate of accesses that have occurred in each of the plurality of unit areas to the total accesses that have occurred in the plurality of unit areas;

when a total number of accesses of unit areas up to the predetermined upper limit in order of a greater number of accesses exceeds the IO rate, two or more unit areas in the predetermined upper limit are set to be movement candidates for the second storage device; and a unit area that has been set as one of the movement candidates a number of continuous times as many as the number of continuing IO concentration is specified as one of the movement target areas.

6. The hierarchical storage device according to claim 5, wherein the processor is further configured to:

extract one or more unit areas having a number of occurrences of data accesses equal to or larger than a threshold among the plurality of unit areas by sorting the unit areas in order of having a larger number of occurrences of data accesses;

generate adjacent unit area groups by grouping adjacent unit areas among the extracted unit areas; and extract one or more of the plurality of adjacent unit area groups having a total number of occurrences of data accesses equal to or larger than a threshold by calculating a total number of occurrences of data accesses of each of the plurality of adjacent groups through adding the number of accesses to each of the unit areas included in the adjacent unit area group and by sorting the plurality of adjacent unit area groups in order of having a larger total number of accesses.

7. A hierarchical storage control device that is connected with a first storage device, and a second storage device that has higher data access performance than data access performance of the first storage device, the hierarchical storage control device comprising a processor configured to:

collect access information related to each of a plurality of unit areas included in the first storage device;

specify a movement target area in which data is moved between the first storage device and the second storage device, by applying a first parameter set based on the collected access information to a movement determining algorithm;

move, to the second storage device, data of the movement target area of the specified first storage device;

specify a movement target area candidate in which data is moved between the first storage device and the second storage device for each of a plurality of second parameter sets by applying each of the plurality of second parameter sets to the movement determining algorithm based on the collected access information;

count a number of occurrences of data accesses to the movement target area candidate specified for each of the plurality of second parameter sets by the second specifying unit, based on the collected access information; and determine, as a recommended parameter set, the parameter set whose cumulative value of the counted number of occurrences of data accesses is the largest by comparing cumulative values of the number of occurrences of data accesses of the plurality of second parameter sets, and update the first parameter set to the recommended parameter set, each of the first parameter set and the plurality of second parameter sets includes a number of continuing IO concentration that represents a time period during which IO is continuously concentrated on each of the unit areas, a predetermined upper limit number of the movement target areas in which the data is simultaneously moved between the first storage device and the second storage device, and an IO rate that represents a rate of accesses that have occurred in each of the plurality of unit areas to the total accesses that have occurred in the plurality of unit areas;

when a total number of accesses of unit areas up to the predetermined upper limit in order of a greater number of accesses exceeds the IO rate, two or more unit areas in the predetermined upper limit are set to be movement candidates for the second storage device; and a unit area that has been set as one of the movement candidates a number of continuous times as many as the number of continuing IO concentration is specified as one of the movement target areas.

8. The hierarchical storage control device according to claim 7, wherein the processor is further configured to:

extract one or more unit areas having a number of occurrences of data accesses equal to or larger than a threshold among the plurality of unit areas by sorting the unit areas in order of having a larger number of occurrences of data accesses;

generate adjacent unit area groups by grouping adjacent unit areas among the extracted unit areas; and extract one or more of the plurality of adjacent unit area groups having a total number of occurrences of data accesses equal to or larger than a threshold by calculating a total number of occurrences of data accesses of each of the plurality of adjacent groups through adding the number of accesses to each of the unit areas included in the adjacent unit area group and by sorting the plurality of adjacent unit area groups in order of having a larger total number of accesses.

* * * * *